United States Patent [19]
Millar et al.

[11] 3,884,448
[45] May 20, 1975

[54] COUPLER

[75] Inventors: James S. Millar, Fountain Valley; Glenn W. Henderson, Tustin, both of Calif.

[73] Assignee: Parker-Hannifin Corporation, Cleveland, Ohio

[22] Filed: Nov. 19, 1973

[21] Appl. No.: 417,264

[52] U.S. Cl. ............ 251/149.9; 251/149.6; 285/316
[51] Int. Cl. ................................................ F16l 37/28
[58] Field of Search............ 251/149.6, 149.8, 149.9; 137/614.01, 614.02, 614.03, 614.05, 614.06; 285/314, 315, 316, 317, 319, 322

[56] References Cited
UNITED STATES PATENTS

| | | | |
|---|---|---|---|
| 2,773,706 | 12/1956 | Leavell | 285/316 X |
| 3,028,179 | 4/1962 | Abramoska | 137/614.04 X |
| 3,454,047 | 7/1969 | Johnston | 137/614.04 |
| 3,479,005 | 11/1969 | De Graaf | 251/149.9 |
| 3,662,793 | 5/1972 | Calisher et al. | 137/461 |
| 3,664,375 | 5/1972 | Marette | 137/614.06 X |
| 3,732,923 | 5/1973 | Fowler | 285/315 X |

*Primary Examiner*—William R. Cline
*Attorney, Agent, or Firm*—John N. Wolfram

[57] ABSTRACT

This invention relates to a fueling coupler that is releasably connectable to a fuel tank adaptor by means of pivotal locks movable to latch positions for holding the adaptor to the coupler and to unlatch positions for releasing the adaptor. The locks have undercut surfaces engageable with an undercut surface on a sleeve mounted on the coupler. When the coupler is not connected to the adaptor, the undercut surfaces hold the locks in their unlatched positions and also hold the sleeve in a retracted position. During connecting of the coupler to the tank, the locks are engageable by the tank adaptor to release the undercut surface engagement whereupon the locks are pivoted by the adaptor into a latch position over a rib on the adaptor for holding the adaptor within the coupler. At the same time the sleeve automatically extends to lock the locks in their latched position. Disconnect of the coupler from the tank is initiated by manual retraction of the sleeve. Upon application of separating movement of the coupler from adaptor either manually or by gravity, the adaptor rib pivots the locks to their unlatched position for releasing the adaptor and for engagement of the undercut surfaces whereby the locks are again held in their unlatch position and the sleeve is held in its retracted position. Because of the relatively large diameter of the coupler that would otherwise require the operator to use two hands for retracting the sleeve, a handle is provided on the sleeve for enabling the same to be retracted by one hand operation. Also, the locks are pivoted toward their latch and unlatch positions by over-center springs.

16 Claims, 5 Drawing Figures

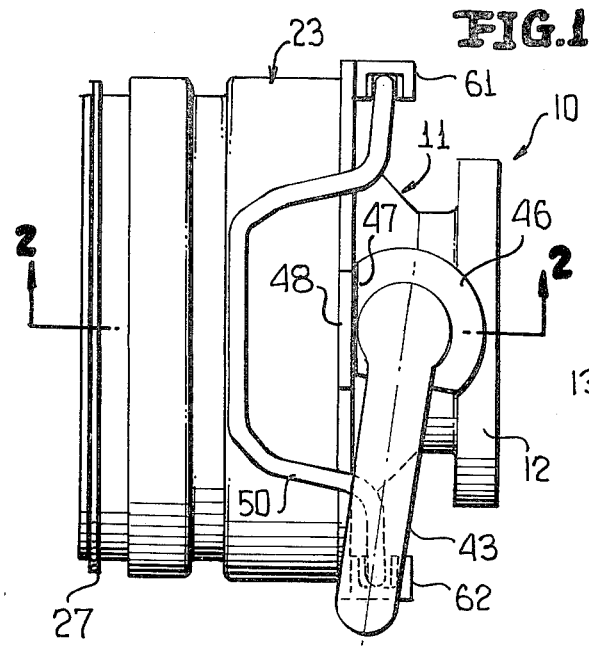
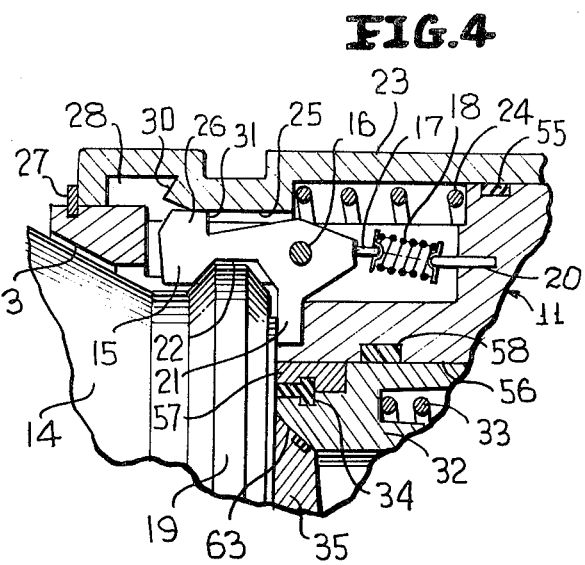
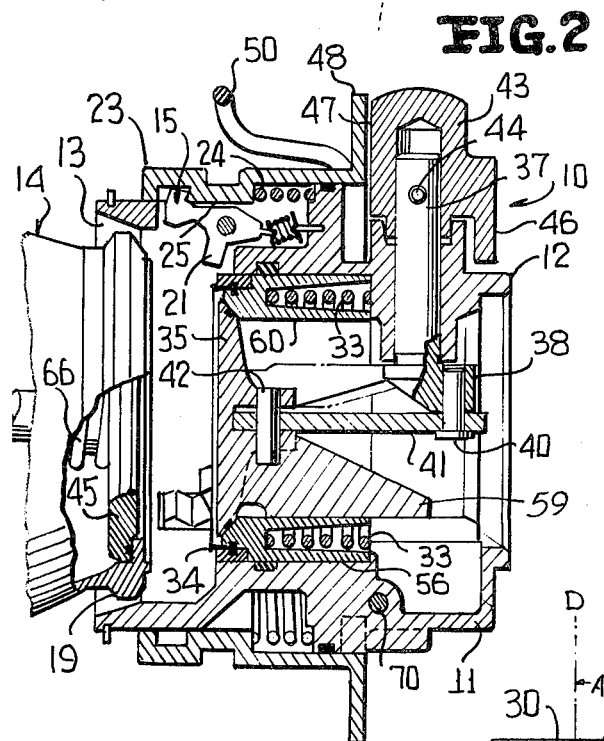
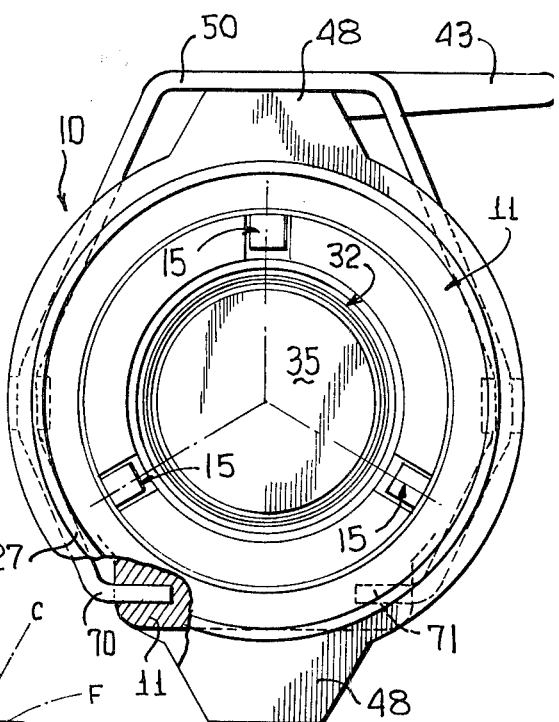
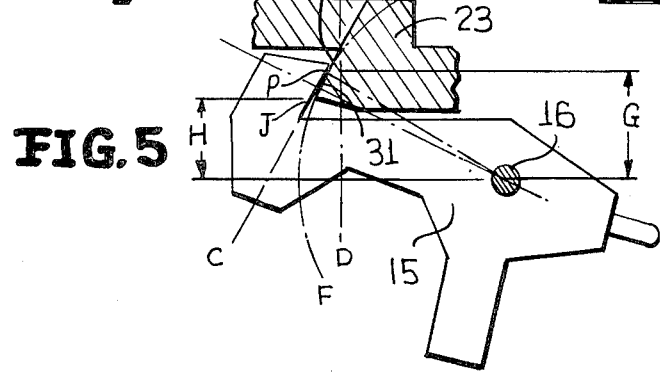

COUPLER

BACKGROUND OF THE INVENTION

In the transfer of liquid fuel between relatively large tanks such as underground storage tanks, tank trucks, aircraft fuel tanks, etc., it is common practice to use relatively large diameter hoses for conveying the fuel from one tank to the other. Thus, a usual size for such hoses is 4 inches ID. This necessitates that the couplers on the hose for connecting the hose to receiving adaptors on the tanks likewise be relatively large in diameter. Some of the couplers heretofore in use utilize an outer sleeve on the coupler that must be rotated for attaching the coupler to the tank adaptor. Such a coupler is shown in U.S. Letters Pat. No. 3,216,744. Other couplers have an outer sleeve that moves axially for making the connection to the tank adaptor, as in U.S. Letters Pat. No. 3,479,005. In either case, because of the large diameter of the coupler sleeve it is generally necessary for an operator to grip the sleeve with both hands and manually rotate or slide the sleeve for connecting and disconnecting the coupler from the adaptor. In other couplers, such as disclosed in U.S. Letters Pat. No. 3,407,847 the outer sleeve extends automatically for connecting the coupler to the adaptor but there is an additional sleeve for retaining the lock elements in a position to hold the outer sleeve in retracted position while the coupler is disconnected from the adaptor.

SUMMARY OF THE INVENTION

This invention provides a fueling coupler in which an outer sleeve is normally in a retracted position and is automatically actuated to an extended position for locking the coupler to the tank adaptor during the connecting operation whereby the operator need only move the coupler axially onto the adaptor to connect the parts. This is accomplished by providing pivoted locks in the coupler which have undercut surfaces that are cooperable with undercut surfaces on the sleeve to hold the locks in their unlatch position and the sleeve in its retracted position when the coupler is not connected to the adaptor. An over-center spring also helps to hold the locks in their unlatch position. Upon insertion of the coupler over the adaptor, the adaptor end face engages the locks to positively pivot the same out of engagement with the undercut surface of the sleeve and into a latch position whereby they engage a rib or projection on the adaptor for holding the adaptor within the coupler. Upon disengagement of the undercut surfaces, the sleeve is automatically spring pressed to an extended position where it locks the locks in their latched position. The over-center springs now press the locks toward their latch position.

To detach the coupler the sleeve is manually retracted. This releases the locks and as the coupler is moved away from the adaptor the locks are moved by the adaptor rib to their unlatch position where their undercut surfaces again engage the undercut surface of the sleeve to hold the locks in their unlatch position and the sleeve in its retracted position. The over-center spring now helps to retain the locks in their unlatch position. A bail type handle pivoted on the body and engaging the sleeve permits an operator to use only one hand for retracting the sleeve to accomplish disconnect.

DETAIL DESCRIPTION

FIG. 1 is a plan view of the coupler.

FIG. 2 is a vertical sectional view of the coupler taken along the line 2—2 of FIG. 1 and shows a portion of the tank adaptor.

FIG. 3 is an end view of the coupler taken from the left in FIG. 1.

FIG. 4 is an enlarged fragmentary sectional view showing one of the locks in its latched and locked position on the tank adaptor.

FIG. 5 is an enlarged fragmentary view showing the engaged undercut surfaces on the locks and sleeve.

Coupler 10 includes a body 11 having at one end a flange 12 for attachment of the coupler to a hose. The other end of the coupler body has a tapered opening 13 to receive an adaptor 14 which is rigidly mounted on a tank, not shown. Adaptor 14 has an annular locking rib or projection 19 and includes a valve poppet 45 normally closed by a spring 66.

Coupler body 11 has three circumferentially spaced locks 15, each pivotally mounted on a respective pin 16 to swing in a radial plane. At one end of each lock 15 there is a projection 17 engageable by an over-center spring unit 18 carried by a hinge pin 20 mounted in body 11. Spring 18 tends to pivot lock 15 in a clockwise direction about pin 16 toward its unlatch position when the coupler is not attached to adaptor 14, as illustrated in FIG. 2, and in a counterclockwise direction toward its latch position when the coupler is attached to the adaptor, as illustrated in FIG. 4. Each lock 15 has an inwardly projecting finger 21, a groove 22 and a head portion 26.

Slidably mounted on the exterior of body 11 is a locking sleeve 23 that is pressed toward an extended position by a spring 24 and which has a cylindrical surface 25 and an annular recess 28. The latter has an undercut end wall or surface 30 which is engageable with a surface 31 on head 26 of lock 15. A felt ring 55 provides a dust seal between sleeve 23 and body 11. If desired, spring 24 may be replaced by several coil springs of small diameter that are circumferentially spaced within sleeve 23 and that act betwee sleeve 23 and body 11 in the same manner as spring 24.

As more clearly shown in FIG. 5, undercut surfaces 30 and 31 lie in a line C—C that is tangent to an arc F-F having its center on pivot 16 with the point of tangency P being at a greater radial distance G from pivot point 16 than the radial distance H of radially inner corner J of sleeve surface 30 from pivot 16. As a result, when sleeve surface 30 is pressed against lock surface 31 by a force tending to extend sleeve 23, there will be a force component applied to lock surface 31 tending to pivot the lock.

Slidably mounted within a bore 56 of body 11 is an annular seat ring 32 that is pressed to the left by a spring 33 and which carries a packing ring 34 held in position thereon by a ring 57 press fitted upon ring 32. Ring 32 is sealed relative to body 11 by a packing 58.

A valve poppet 35 is connected to a stem 41 by a pin 42 and has several circumferentially spaced guide ribs 59 slidable within bore 60 of ring 32. Stem 41 is connected to a crank arm 38 of a shaft 37 by a pin 40 and shaft 37 is connected to a handle 43 by a pin 44. Handle 43 includes an arcuate portion 46 having a straight side 47 which in the position of the handle shown in FIG. 1 is opposite a lug 48 on sleeve 23.

Sleeve 23 has thereon two diametrically located lugs 61, 62 that are slotted to loosely receive a bail type handle 50 made of a rod that is bent to the generally U shape illustrated in FIGS. 1 and 3 and that has its ends 70, 71 pivotally mounted in body 11.

OPERATION

When coupler 10 is not connected to tank adaptor 14, the coupler parts are in positions as shown in FIGS. 1 and 2. At this time, sleeve 23 is in retracted position and valve handle 43 is in a position for maintaining valve poppet 35 in closed position wherein valve seat 63 is pressed against poppet 35 by spring 33. Handle side 47 is closely adjacent lug 48 to prevent turning of handle 43 for opening valve poppet 35 while sleeve 23 is in retracted position.

Also in this position of the parts, locks 15 are in their unlatch position in which sleeve undercut surfaces 30 engages lock surface 31. Sleeve 23 at this time is urged toward an extended position by spring 24 but is prevented from extending by the engagement of surfaces 30 and 31. Because of the undercut nature of surface 30, as well as by action of over-center springs 18, locks 15 are held in the unlatch position of FIG. 2, and are thus effectively prevented from pivoting in a counter-clockwise direction about pin 16. Without undercuts 30, 31, the pressure of spring 24 would be insufficient to pivot locks 15 counterclockwise against the pressure of springs 18, but such pivoting might be accomplished if a force is applied to sleeve 23 by surface 47 of handle 43 upon any attempt to move the latter to its open position while the coupler is disconnected from the adaptor. Such a force, acting through sleeve 23 on lock surface 31 would overcome springs 18 and move locks 15 to their lock position and sleeve 23 would move to its extended position. Thus, undercuts 30, 31 positively prevent counterclockwise movement of the locks by manipulation of handle 43 while the coupler is disconnected from the adaptor.

To connect coupler 10 to tank adaptor 14, the coupler is inserted over the end of the adaptor as shown in FIG. 2. Upon further movement of the coupler toward the adaptor the end of the latter will engage projections 21 of locks 15 and forcibly pivot the latter in a counter-clockwise direction to the latched position shown in FIG. 4 in which groove 22 has swung over adaptor rib 19 for positively connecting the coupler to the tank adaptor. In this connected position, the end of the tank adaptor is in sealed engagement with packing 34.

Upon forcible movement of locks 15 to their latch position, springs 18 swing to an opposite over-center position shown in FIG. 4 for pressing the locks to their latch position and spring 24 moves sleeve 23 to its extended position, also as shown in FIG. 4. In this extended position of sleeve 23, cylindrical surface 25 engages the outer surface of heads 26 of locks 15 to prevent clockwise pivoting of locks 15 and thus the locks are locked in their latch position for maintaining coupler 10 connected to tank adaptor 14.

In the extended position of sleeve 23, lug 48 is sufficiently spaced from handle flat surface 47 to permit rotation of handle 43 in a counterclockwise direction through an arc of about 180° for turning shaft 37 and crank arm 38 to move valve poppet 35 leftward to an open position relative to seat ring 32. As poppet 35 moves to the left, it engages check valve 45 in adaptor 14 to also open the latter whereby liquid fuel may flow through the coupler. As valve handle 43 is thus moved to its open position, arcuate flange 46 rotates to a position opposite lug 48 whereby retraction of sleeve 23 for releasing locks 15 is prevented.

To disconnect the coupler from the adaptor, the operator must first rotate valve handle 43 to its close position shown in FIG. 1. This closes valve poppet 35 against seat ring 32 and permits adaptor valve 45 to be moved to its closed position by spring 66. Arcuate portion 46 of handle 43 is now out of register with sleeve lug 48 and the operator can grasp bail 50 with the fingers of one hand while bracing his thumb against handle 43 and swing the bail about pivots 70, 71 to move sleeve 23 to its retracted position against the pressure of spring 24. Retraction of the sleeve moves cylindrical surface 25 out of register with heads 26 of locks 15 whereupon separating movement of the coupler and adaptor causes adaptor rib 19 to pivot locks 15 to their unlatch positions in which they release tank adaptor rib 19 and lock surfaces 31 are opposite sleeve surface 30 and over-center springs 18 now urge the locks toward their unlatch position. Upon release of bail 50 by the operator, spring 24 urges sleeve surface 30 into tight engagement with lock surfaces 31 for holding locks 15 in their unlatch position and in which position they prevent sleeve 23 from moving to its extended position. The coupler may now be completely disconnected from the tank adaptor.

Thus, the coupler of the present invention can be connected to the tank adaptor by simply inserting it over the end of the adaptor until the latter engages and rotates locks 15 to their latch positions in which they engage adaptor rib 19. When this occurs sleeve 23 is released and automatically extends for positively locking the locks in their latch position. Also, bail 50 permits the operator to use only one hand for retracting the sleeve to initiate disconnect of the coupler from the adaptor.

We claim:

1. A coupler adapted to be connected and disconnected from an adaptor, said coupler comprising a body, a lock pivotally mounted on the body for movement between a latch position and an unlatch position, a sleeve mounted on the body and axially movable between a retracted position and an extended position, means on the sleeve engageable with the lock to hold the latter in its latch position when the sleeve is extended, and a surface on the sleeve facing toward said extended position engageable with a surface on the lock in a manner to hold the lock in its unlatch position when the sleeve is in its retracted position.

2. The coupler of claim 1 in which the sleeve is spring pressed toward its extended position and said spring pushes said sleeve surface into engagement with said lock surface in said unlatch position.

3. The coupler of claim 2 in which said coupler has a passage therethrough and a valve movable to positions for opening and closing said passage, said lock is movable by said adaptor from its unlatch position to its latch position, an actuator means for opening and closing said valve, and a surface on said actuator engageable with an abutment on said sleeve when the sleeve is in its retracted position and the actuator is in its valve closing position for preventing said actuator from moving to a position for opening said valve, and said sleeve and lock engagement being such that said sleeve is non-yieldably retained thereby in its retracted position until said lock is moved to its latch position to thereby prevent said actuator from moving the sleeve to its extended position while the lock is in its unlatch position.

4. The coupler of claim 3 in which said actuator has a portion engageable by said sleeve when the sleeve is in its extended position and the actuator is in its position for opening the valve whereby said sleeve is prevented from moving to its retracted position, and means for retracting the sleeve against the pressure of its spring when said valve is closed.

5. The coupler of claim 1 in which the lock is spring pressed in the direction of its unlatch position while the lock is in such unlatch position.

6. The coupling of claim 1 in which the lock has a portion engageable by said adaptor to move the lock from its unlatch position to its latch position.

7. The coupler of claim 1 in which said sleeve surface is inclined relative to a transverse plane through the coupler body in a manner to hold said lock in said unlatch position.

8. The coupler of claim 7 in which said lock and sleeve surfaces are flat and lie in the same plane when engaged and said lock is in its full unlatch position.

9. The coupler of claim 1 in which said body has a generally U shaped bail with the free ends of the legs of the U pivotally mounted on the body and intermediate portions of said legs are engaged with the sleeve whereby pivoting of the bail in one direction retracts said sleeve.

10. The coupler of claim 9 in which said sleeve has a pair of lugs extending therefrom and having slots therein to receive said intermediate leg portions to provide said engagement between the bail and sleeve, and said free ends and said intermediate leg portions lying in a common plane.

11. The coupler of claim 1 in which said lock is engaged by an over-center spring that urges the lock in the direction of its unlatch position when the lock is in such position and which urges the lock in the direction of its latch position when the lock is in the latter position.

12. The coupler of claim 1 in which said sleeve surface is radially outward of the pivot for said lock and has an angle such that an arc drawn from the center of said pivot and tangent to a line coincident with said sleeve surface will have its point of tangency with said line radially outwardly of the radially inner edge of said sleeve surface.

13. In combination, a coupler and an adaptor, one end of said adaptor having an abutment face and a radially outward projection, said coupler comprising a body having a bore in which said adaptor end is receivable, a lock mounted on said body and pivotal from a latch position in which the lock engages said adaptor projection to retain the adaptor within said bore to an unlatch position in which said lock disengages from said projection to release the adaptor for withdrawal from said bore, said lock having a first surface engageable by said adaptor abutment face for positively pivoting the lock from its unlatch position to its latch position when the adaptor enters said bore, a member mounted on the body and movable from a retracted position to an extended position, a surface on the member engageable by the lock when the latter is in its unlatch position for holding the member in its retracted position, and a surface on the member engageable with said lock to hold the lock in its latch position when the member is in its extended position.

14. The combination of claim 13 in which there is a means for automatically extending the member when the lock is moved to its latch position.

15. The combination of claim 14 in which said means is a spring that constantly urges said member toward its extended position, another spring urging the lock in the direction of its unlatch position when the lock is in its unlatch position, and said surface being shaped so that it positively locks the lock in its unlatch position until said lock is pivoted by engagement with said adaptor abutment face.

16. The combination of claim 15 in which said lock has a groove for receiving said adaptor projection in the latch position of the lock and there is a face on the lock adjacent said groove for contact by said adaptor abutment face for moving the lock to its latch position.

* * * * *